(12) United States Patent
Bieck et al.

(10) Patent No.: US 8,807,592 B2
(45) Date of Patent: Aug. 19, 2014

(54) INTERIOR PANELING PART WITH AN AIRBAG DOOR-FLAP

(71) Applicants: Lars Bieck, Berlin (DE); Sebastian Brett, Berline (DE); Paul Pickett, Rayleigh (GB)

(72) Inventors: Lars Bieck, Berlin (DE); Sebastian Brett, Berline (DE); Paul Pickett, Rayleigh (GB)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 13/961,702

(22) Filed: Aug. 7, 2013

(65) Prior Publication Data

US 2014/0042731 A1   Feb. 13, 2014

(30) Foreign Application Priority Data

Aug. 7, 2012  (DE) .................. 10 2012 107 234

(51) Int. Cl.
*B60R 21/216* (2011.01)
*B60R 21/215* (2011.01)

(52) U.S. Cl.
CPC ..... *B60R 21/216* (2013.01); *B60R 2021/21531* (2013.01)
USPC ..................................... 280/728.3

(58) Field of Classification Search
CPC .............. B60R 21/216; B60R 21/2155; B60R 2021/21531; B60R 2021/21537; B60R 2021/2161; B60R 2021/2163
USPC ..................................... 280/728.3
See application file for complete search history.

(56) References Cited

U.S. PATENT DOCUMENTS

| | | | |
|---|---|---|---|
| 6,170,859 B1 | 1/2001 | Kausch | |
| 8,113,538 B2 * | 2/2012 | Hayashi | 280/728.3 |
| 8,177,255 B2 * | 5/2012 | Le Hoang et al. | 280/728.3 |
| 8,424,905 B2 * | 4/2013 | Brunet | 280/728.3 |
| 2005/0116453 A1 | 6/2005 | Geum | |
| 2009/0066068 A1 * | 3/2009 | Kanno | 280/741 |
| 2011/0278827 A1 * | 11/2011 | Laboeck et al. | 280/743.2 |

FOREIGN PATENT DOCUMENTS

| | | |
|---|---|---|
| DE | 29708446 U1 | 9/1997 |
| DE | 10358896 A1 | 7/2005 |
| DE | 102005017124 A1 | 10/2006 |
| DE | 102006049316 A1 | 4/2008 |
| DE | 102007028621 * | 7/2008 |
| DE | 102009049358 A1 | 4/2011 |
| EP | 0926013 A1 | 6/1999 |
| EP | 2193960 A1 * | 6/2010 |
| WO | 2007147966 A2 | 12/2007 |
| WO | 2008087014 A1 | 7/2008 |

OTHER PUBLICATIONS

German Office Action, dated Mar. 18, 2013, issued in German Patent Application No. 10 2012 107 234.5 filed Aug. 7, 2012.

* cited by examiner

*Primary Examiner* — Drew Brown
(74) *Attorney, Agent, or Firm* — Dickinson Wright PLLC

(57) ABSTRACT

An interior paneling part is provided. The interior paneling part includes a hinge area with a rib; an airbag door-flap, and the airbag door-flap is rotatably affixed to the interior paneling part in an open state in the hinge area via a flexible strap hinge, and the rib is disposed in the hinge area and is defined by an change in length of the strap hinge.

12 Claims, 5 Drawing Sheets

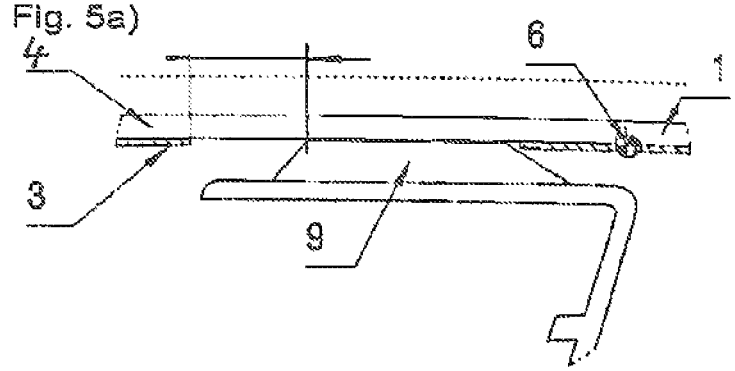
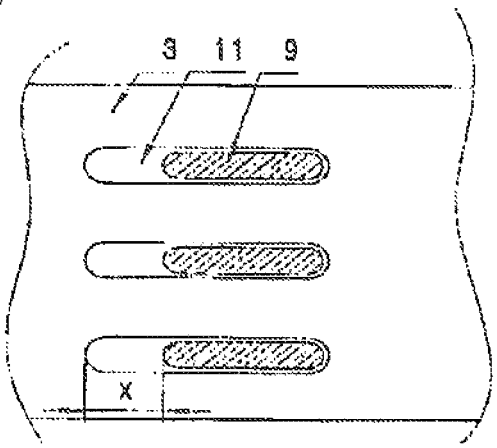
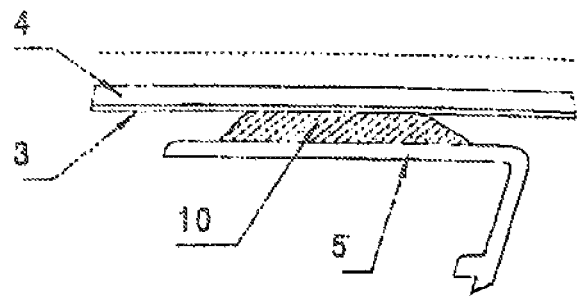

INTERIOR PANELING PART WITH AN AIRBAG DOOR-FLAP

CROSS-REFERENCE TO RELATED APPLICATION

This U.S. Patent Application claims priority to German Patent Application No. 10 2012 107234.5, filed Aug. 7, 2012. The entire disclosure of the application being considered part of the disclosure of this application, and hereby incorporated by reference.

BACKGROUND

The disclosure relates to an interior paneling part with an airbag door-flap for a motor vehicle with an airbag system.

Airbag door-flaps in modern airbag systems are integrated into the interior paneling and are connected by hinge solutions to the interior paneling parts. As a result, it succeeds in opening up the airbag door-flaps upon the deployment of the airbag, and the flaps are held at the same time by the hinge and are thus, not flung into the passenger compartment, where they can, uncontrolled, injure the vehicle passengers.

Diverse technologies for airbag door-flaps and reinforcements for the hinge area are known. For example, airbag door-flaps are provided as metal plates affixed to a carrier part/substrate, Alternatively, airbag door-flaps are made of soft material welded by injection molding to the carrier part/substrate, sprayed-on fabric, or sprayed-on metal systems.

The present invention can be applied to airbag door-flaps in airbag systems that are connected to the interior paneling part by means of a flexible hinge solution of the type of a strap hinge. In order to ensure the functional opening and swinging out of the airbag door-flaps, an elongation of the type of an extra length for the strap hinge is required in the hinge area. The rotation of the airbag door-flap is made possible by lengthening the strap hinge, which is not molded.

In prior art, for example, solutions are known in which a cable in the area concerned allows the free movement of the airbag door-flap on an interior paneling part, such as an instrument panel, for instance. At the same time, the necessary additional cable length is released by means of breaking off a rigid pin.

These and similar hinge solutions are disclosed, for example, in EP 1062127 B1, FR 2957871 B1, GB 2438748 B, WO 03082632 A2, and WO 03082635 A2. In addition, in DE 102006049316 A1, an interior paneling part for a motor vehicle is disclosed, in which flexible support means are provided for the airbag door-flap, which exhibit side areas that can be unfolded and which limit the movement of the opening airbag door-flap.

An airbag door-flap on an instrument panel is disclosed in WO 2007147966 A2, which is held by means of a hinge made of flexible material. The flexible material can be made out of cloth or a knit and the lengthening of the hinge is furnished by a plurality of folds in the flat, flexible material.

The drawback to airbag systems with stiff, metal connections lies in their weight and they require a form-fit connection to the carrier part in order to avoid deformation. These systems consequently require a pre-formed hinge and/or a mold in order to achieve the elasticity necessary to open a door flap. The known flexible hinge solutions have the disadvantage that elongation of the flexible hinge material by means of folds or bulges makes it difficult to achieve precise and reliably predictable lengthening, so that the hinge effect frequently cannot be designed to be sufficiently reproducible.

SUMMARY

The disclosure relates to an interior paneling part with an airbag door-flap is executed more easily and inexpensively with respect to technical fabrication. The additional elements will make letting out a length possible, as well as a better opportunity for characterizing the change in hinge length.

The disclosure relates to an interior paneling part with an airbag door-flap, the airbag door-flap being rotatably affixed to the interior paneling part in an open state in a hinge area via a flexible strap hinge. A rib is disposed in the hinge area, in which a change in the length (X) of the strap hinge is defined.

According to a first embodiment of the invention, the rib is constructed as a deformation rib, wherein the deformation rib is disposed on the inside of the interior paneling part or the airbag retainer and hanging from it. The strap hinge runs on the inside of the interior paneling part or of the airbag retainer above the deformation rib. Consequently, it follows the contour of the rib first inward and then outward again. Due to this path, a spare length results for the strap hinge at which it is used in case the airbag is deployed.

This results, according to a further development of the first embodiment of the invention, in a compression of the rib.

The deformation rib is thereby constructed as a compression rib, wherein this compression rib is made up of a compressible material. With the tensile load of the strap hinge on the interior paneling part, the compression rib is distorted such that the strap hinge is lengthened by an elongation (X). The change in length results, due to the compression of the rib, in the strap hinge then running closer to the inside of the airbag door-flap in the hinge area. The strap hinge is affixed, once at the end, to the underside facing away from the passenger compartment or the inside of the interior paneling part and is affixed on the other side to the airbag door-flap. If the airbag is deployed and the airbag door-flap is pressed outward, the strap hinge is tightened and compresses the compression rib, whereby a change in length occurs and the airbag door-flap can be folded down without being obstructed by the strap hinge. The compression rib is may be disposed in the tensile direction, An alternative to the first embodiment is that the deformation rib is constructed as a buckling rib. The buckling rib preferably exhibits a kink at the base of the rib. With the tensile load of the strap hinge, the buckling rib is broken off at the interior paneling part due to the deployment of the airbag, such that the strap hinge, in a manner similar to that described previously, is lengthened by an elongation (X). In this embodiment, the rib is not compressed, but is bent and snapped off and consequently releases the additional length of the strap hinge, due to the change in length and that is the reduced height. The buckling rib is preferably disposed in a way to transverse in the tensile direction.

According to a second embodiment, the rib is constructed as a guide rib. The guide rib connects the airbag retainer to the inside of the interior paneling part. The strap hinge runs between the interior paneling part and the airbag retainer and is guided by the guide rib. At the same time, the guide rib penetrates the strap hinge in the area of a recess. The longitudinal extent of the recess in the strap hinge corresponds to the sum of the change in length (X) and the longitudinal extent of the guide rib. The recess is a type of slit or slot in the tensile direction, and the strap hinge can move inside the clearance defined in the tensile direction.

According to a third embodiment, the rib is constructed as a clamping rib on the airbag retainer. The strap hinge is disposed between the clamping rib and the inside of the interior paneling part and is clamped tightly, so that when the airbag door-flap opens, the tensile forces at the strap hinge are greater than the clamping and frictional force, and an elongation (X) of the strap hinge is let out, defined by size of the forces.

Preferably, a plurality of ribs is disposed in the hinge area of the interior paneling part and the strap hinge.

According to a particularly preferred embodiment of the invention, the second and third embodiments of the invention are used together. At the same time, guide ribs and clamping ribs are disposed in the region of the hinge. The advantage therewith of the precisely specified change in length (X) due to the use of the guide ribs can be combined with the advantage of influencing the opening characteristics of the door-flap, due to sizing the clamping and frictional forces at the clamping ribs.

Advantageously, the guide ribs and the clamping ribs are disposed alternating transverse to the strap hinge.

In another embodiment, the strap hinge is made of a very light sheet of fabric.

Due to the structural features of the solutions presented, with the use of ribs of various function in combination with a light sheet of fabric, considerable reductions in weight can be achieved compared with conventional airbag door-flap systems.

A hinge solution for an airbag door-flap with a flexible strap hinge and specific structural rib features to control the length of the strap hinge and thereby the effect of the opening characteristics of the airbag door-flap is designed.

The effect of the characteristics of the lengthening/displacement of the strap hinge, that is, the sheet of fabric, results from frictional elements which are designated as clamping ribs. Implementation of this principle results in the sheet of fabric being clamped between the airbag retainer and the interior paneling part. Due to the friction produced and the clamping effect, which is defined by the arrangement of the rib height, the motion characteristics of the sheet of fabric can be influenced and controlled. Displacement of the hinge point is made possible by a specified change in length, also designated as a free path "X".

The change in length of the strap hinge is generally not to be understood as elasticity of the strap hinge. The strap hinge is admittedly flexible but cannot be elongated, that is, only extremely slightly.

The change in length is consequently always associated with the specified provision of an extra length for the strap hinge, which is then activated for optimal functioning of the hinge in the event of airbag deployment.

The ribs cause the activation, that is, letting out the extra length, which is also designated as the change in length (X).

These ribs are positioned in the hinge region of the sheet of fabric which let out, by collapsing or distorting, the extra length of the sheet of fabric required for optimal hinge functioning. The sheet of fabric is provided in the as-delivered state and in the installed state clings onto the predetermined structure. This may be on the underside of the interior paneling part and the airbag door-flap.

As a result of the rotation of the airbag door-flap upon deployment of the airbag, the sheet of fabric is pulled in the longitudinal direction and causes a force to be introduced to the elements, which leads to a distortion of the elements and therewith to a change in the length of the sheet of fabric.

According to the aspects disclosed herein, weight reduction becomes possible versus conventional systems, due to the fact that convention systems may have metal plates and costly mechanical hinge solutions, The aspects disclosed herein may be ten times lighter than a system made of metal and four times lighter than a comparable system made of thermoplastic, injection molded parts.

In contrast to systems with welded, injection-molded parts, the light, synthetic sheet of fabric has a very low rigidity and adjusts to the shape of the carrier better, that is, to the interior paneling part, if the synthetic sheet of fabric is affixed thereto. As a result, distortion of the carrier part is avoided, The change in length of the synthetic sheet of fabric is ensured by the specifically constructed ribs.

According to the aspects disclosed herein, the opening characteristics, which are associated with the type and manner of letting out the change in length, are able to be precisely determined.

DESCRIPTION OF THE DRAWINGS

Further details, features, and advantages of the invention embodiments result from the following description of embodiment examples with reference to the accompanying drawings. Shown are FIG. 1a, b, c: depiction of the principle of hinge fastening for the airbag door-flap according to prior art, FIG. 2a, b: an airbag door-flap-fastening system on the interior paneling part, FIG. 3a, b: a compression-rib cross-section, FIG. 4a, b: a buckling-rib cross-section, FIG. 5a, b: a guide-rib and strap hinge cross-section, and FIG. 6: a clamping-rib cross-section.

DETAILED DESCRIPTION

Figure 1A:
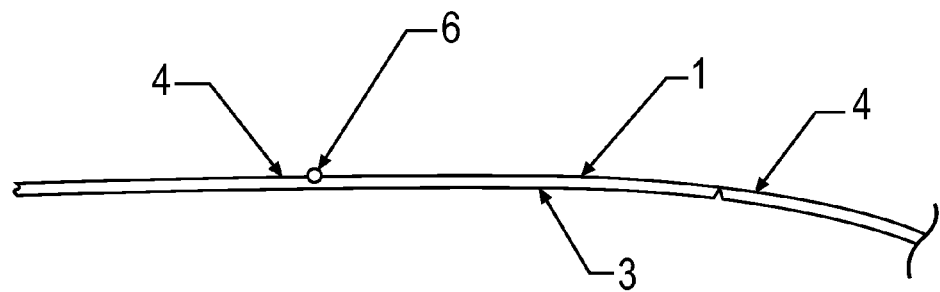

In FIGS. 1a), b), and c), depictions of the principle of hinge fastening for the airbag door-flap are shown.

FIG. 1a shows an airbag door-flap 1, which is integrated into the interior paneling part 4 of a motor vehicle. The airbag door-flap 1 is connected on the underside to a strap hinge 3, which extends above a rotation point 6 as far as the interior paneling part 4 and is connected firmly to it.

Figure 1B:
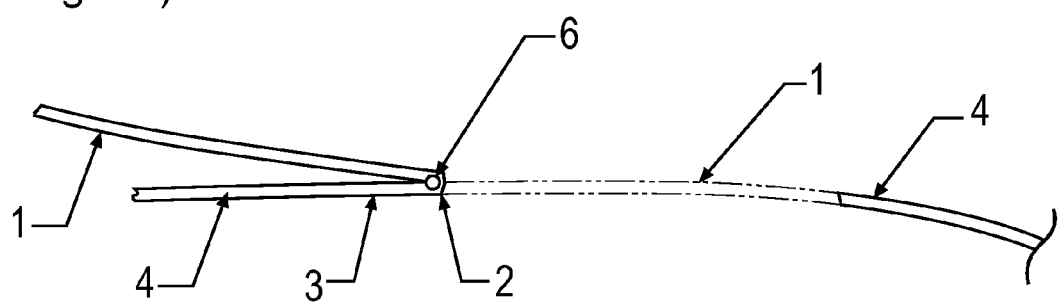

FIG. 1b shows the airbag door-flap 1 after deployment of the airbag, which is not depicted. The airbag door-flap 1 rotates about the rotation point 6 of the strap hinge 3 and is held by the strap hinge 3. The hinge area 2 of the flexible strap hinge 3 makes the rotation of the airbag door-flap 1 possible.

Figure 1C:
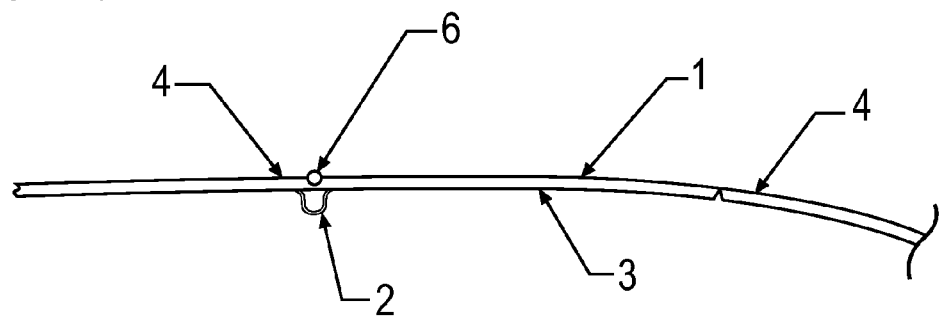

FIG. 1c shows an extra length of the strap hinge 3 is held in readiness in the hinge area 2 with a supply of length in the form of a fold, for example, in order to make rotation of the airbag door-flap 1 about the rotation point 6 possible without resistance from the strap hinge 3 material. In practice, it is desirable for this extra length of the strap hinge 3 to be reproducibly sized in the hinge area 2 and as a result for the opening characteristics of the airbag door-flap 1 to be designed to be precisely pre-determinable.

Figure 2A:
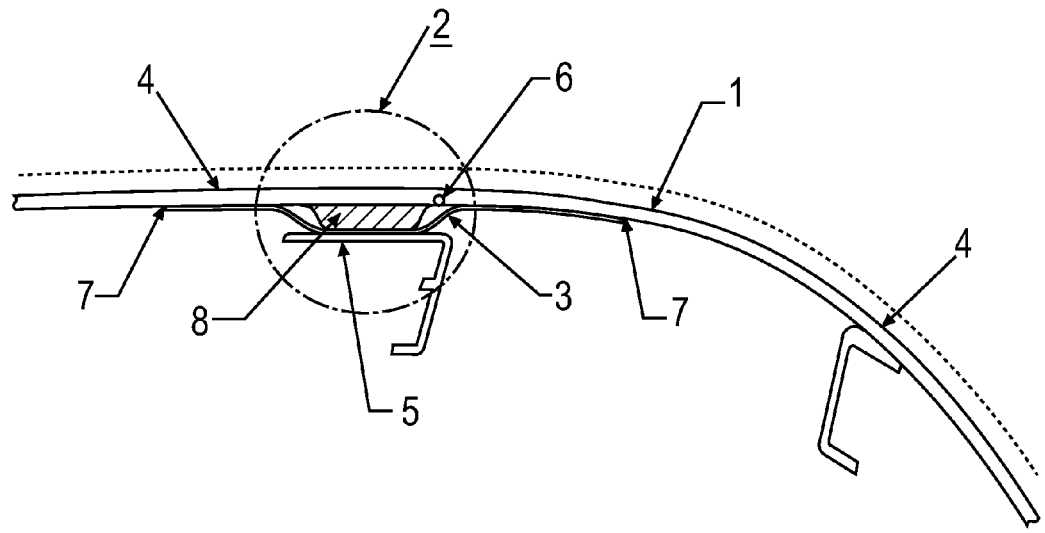
Figure 2B:
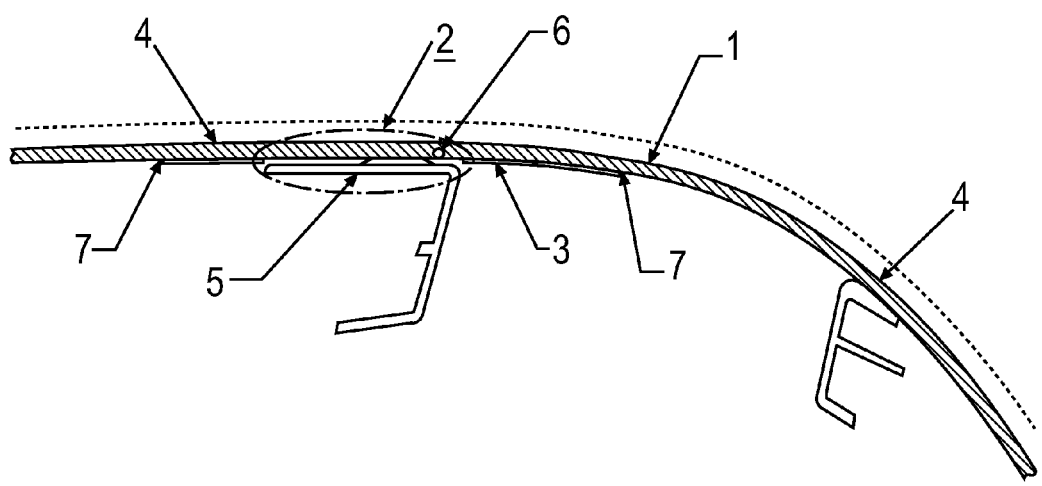

FIGS. 2a-b are an airbag door-flap-fastening system on the interior paneling part 4.

Figure 3A:
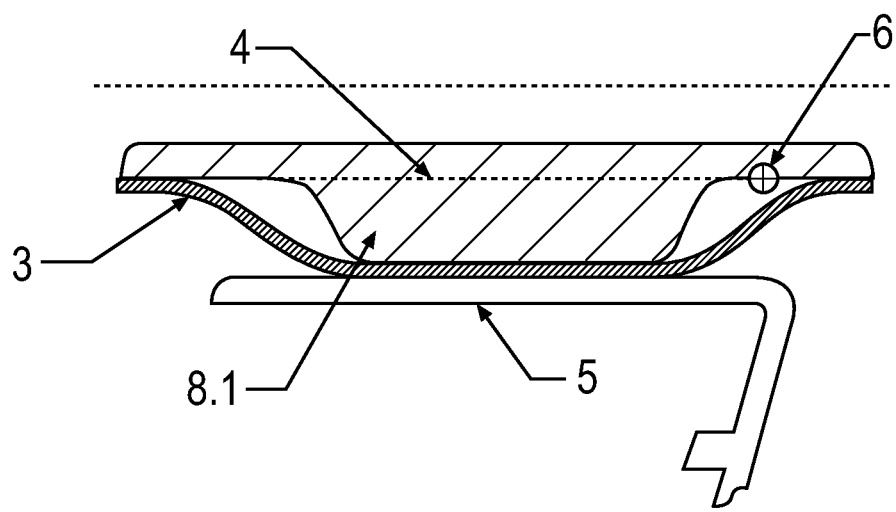

Referring to FIG. 2a, an overhead view is shown, which is represented in detail in FIGS. 3a and b. The interior paneling part 4 has an area that, exhibits the airbag door-flap 1, which is also designated as the airbag-exit cover. The airbag door-flap 1 is connected to the interior paneling part 4, for example, by predetermined break-off points and looks outward for the vehicle passengers, not as a separate part. Upon deployment of the airbag, the airbag door-flap 1 springs out from the interior paneling part 4. At the same time, the ejected airbag door-flap 1 presents no danger to the vehicle passengers; it is held by a hinge and performs a directed rotary motion about a rotation point 6 in a hinge area 2. The hinge itself is formed by a strap hinge 3, which in longitudinal extent, represented in cross-section in its edge areas, is connected by means of fastening areas 7 to the interior paneling part 4 and to the airbag door-flap 1. The deformation rib 8 is formed on the interior paneling part 4 in the hinge area 2 and is in contact with the airbag retainer 5. The strap hinge 3, which is configured as a sheet of fabric, runs on the underside of the interior paneling part 4 and along the airbag door-flap 1 and is firmly connected to it in the fastening area 7. If the airbag is deployed, then the airbag door-flap 1 springs out from the interior paneling part 4 but is held at the strap hinge 3, which is connected in the fastening area 7 to the interior paneling part 4, by a weld, for example. Consequently, the airbag door-flap 1 receives a rotational impulse and rotates about the rotation point 6 counterclockwise, In order for this rotary motion to be executed unhindered, an change in length of the strap hinge 3 is required, which is provided by an extra length (X), due to the tensile load of the strap hinge 3 and the deformation of the deformation rib 8 associated therewith.

Analogous to this mode of action, an airbag door-flap fastening system is depicted in FIG. 2*b*, which, differing from the embodiment in FIG. 2*a*, exhibits in the hinge area elements in the form of clamping ribs. This embodiment is represented further in FIGS. 5*a*, 5*b*, and 6.

FIGS. 3*a*) and 3*b*) show a compression-rib 8.1 cross-section.

Figure 3B:
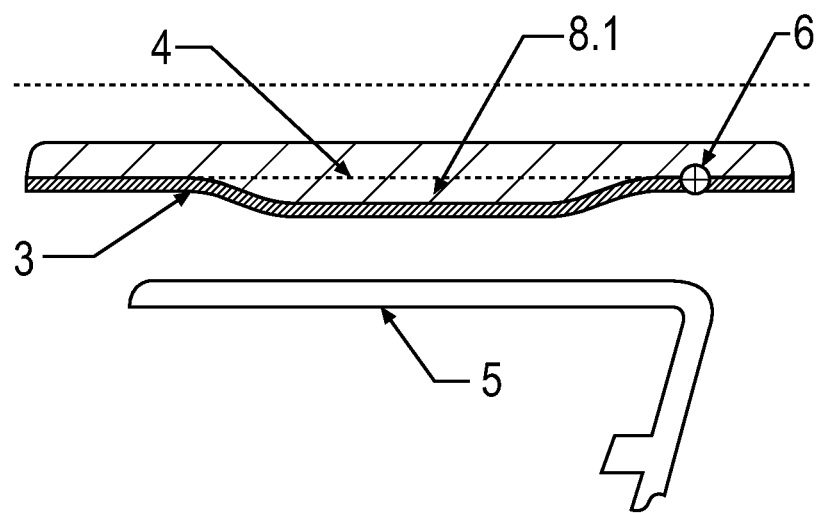

In the example depicted in FIGS. 3*a* and 3*b*, the compression rib 8.1 is consequently made of the same material as the interior paneling part 4. However it may be constructed of a more readily compressible material than the interior paneling part 4. Especially suitable are synthetic substances of the foam-material type, which can even be compressed with low forces. The concept of a rib, depending on the function as a compression rib 8.1, is rather to be understood as an area in longitudinal extent and elongation direction, which does not absolutely exhibit a height greater than the width. If this is the case, then the compression rib 8.1 is disposed in longitudinal extent along the cross-section.

The compression rib 8.1 is depicted in FIG. 3*a*, and the strap hinge 3 follows the contour of the compression rib 8.1, running on the inside of the interior paneling part 4, and then springs back again to the inside of the airbag door-flap 1. In the embodiment example depicted, the compression rib 8.1 is supported with the strap hinge 3 running above it at the airbag retainer 5. The compression rib 8.1 is depicted in FIG. 3*b* in a state after the deployment of the airbag, The strap hinge 3 compresses the compression rib 8.1 against the tensile load, owing to the rotational motion of the airbag door-flap 1 beginning and produces an extra length due to the change in the outer contour, which allows for the resistance-diminished rotational motion of the airbag door-flap 1. The change in contour of the deformed compression rib 8.1 is visualized by the distance of the compression rib 8.1 from the airbag retainer 5.

Alternatively, the compression rib 8.1 can be disposed at the airbag retainer 5.

Figure 4A:
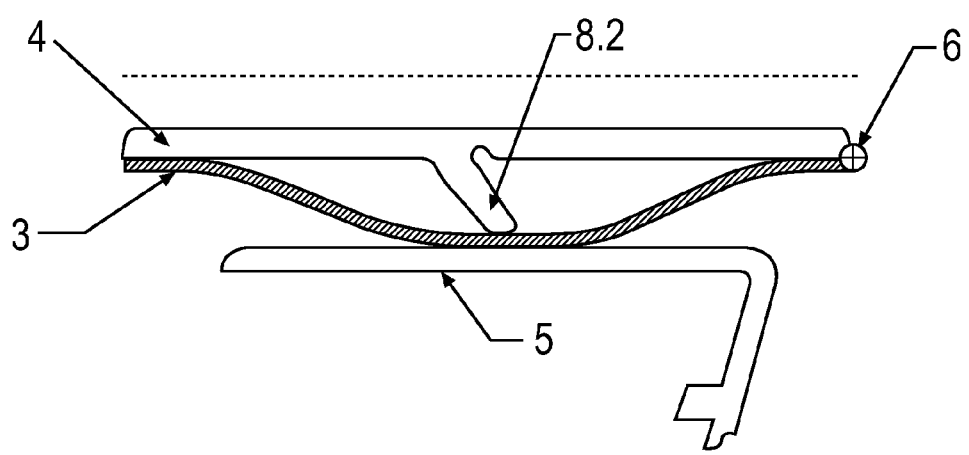
Figure 4B:
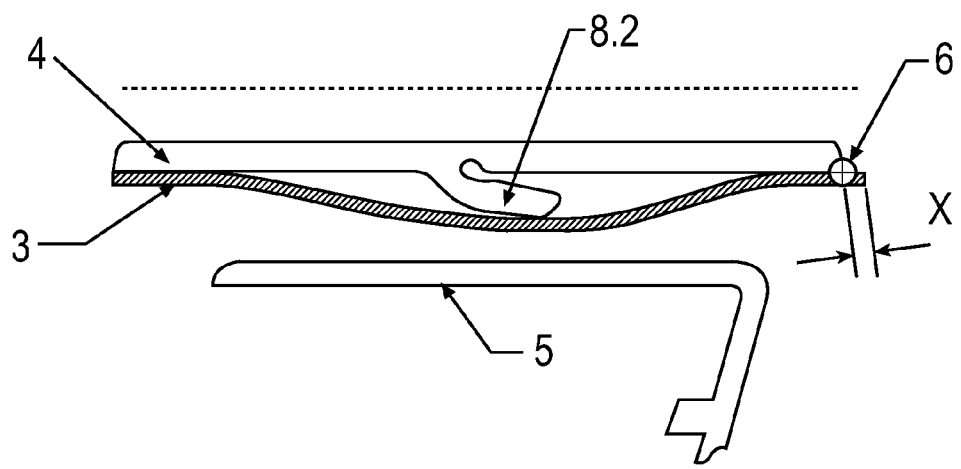

FIGS. 4*a* and 4*b* show a buckling-rib 8.2 cross-section.

Referring to FIG to FIG. 4*a*, the buckling rib 8.2 is perpendicular to the rotation direction and consequently is injected transverse to the longitudinal direction at the interior paneling part 4. The strap hinge provided as a sheet of fabric 3 in the installed state clings to the rib structure of the buckling rib 8.2 and the construction is in turn supported by the airbag retainer 5. A chamfer (not shown), on the rib base makes the specific bending and snapping off the buckling rib 8.2 possible here, in order to let out the additional travel of the sheet of fabric 3 in the event of a tensile load due to the airbag deployment.

Referring to FIG. 4*b*, The extra length (X) of the strap hinge 3 resulting from snapping of the buckling rib 8.2 is depicted.

Alternatively, the buckling rib 8.2 can be disposed at the airbag retainer 5.

FIGS. 5*a* and 5*b* show a guide-rib 9 and strap hinge 3 cross-section.

Referring to FIG. 5*a*, a guide rib 9 and a strap hinge 3, airbag door-flap 1, and interior paneling part 4 are shown. The interior paneling part 4 is firmly connected to the guide rib 9, which is connected fast to the airbag retainer 5.

The strap hinge 3 is depicted in plain view in FIG. 5*b*, in a horizontal longitudinal section through the guide rib 9. The recesses 11 are disposed in the form of slits or slots in the longitudinal direction of the tensile load of the strap hinge 3. The recesses 11 are penetrated by the guide ribs 9, and there is a difference in length in the amount of the extra length (X), about which the strap hinge can move in the longitudinal direction.

FIG. 6 shows a clamping-rib 10 cross-section. The clamping-rib 10 serves to facilitate the lengthening of the strap hinge 3.

The operation of the clamping-rib 10 is based on providing a specific release of the strap hinge 3 to make displacement of the hinge point possible by clamping. It is hereby possible using different parameters to adjust and define the characteristics of the displacement. This is made possible, for instance, by the friction between the sheet of fabric 3 and the airbag retainer 5. The height and material properties of the clamping rib 10 in addition define the clamping forces between the clamping rib 10 and the interior paneling part 4 that operate on the sheet of fabric 3 lying in between.

The clamping rib 10 is provided so that friction exists between the sheet of fabric 3 and the airbag retainer 5, and it significantly affects the characteristics of the change in length X and the displacement of the sheet of fabric 3.

We claim:

1. An interior paneling part, comprising:
   a hinge area with a rib; and
   an airbag door-flap,
   wherein the airbag door-flap is rotatably affixed to the interior paneling part in an open state in the hinge area via a flexible strap hinge, and the rib is disposed in the hinge area and is defined by an change in length of the strap hinge and wherein the rib is constructed as a deformation rib, and the deformation rib is disposed on an inside of the interior paneling part and projecting from the interior paneling part, and the strap hinge runs out to the inside of the interior paneling part along the deformation rib.

2. The part according to claim 1, wherein the deformation rib is constructed as a compression rib, and the compression rib is made of a compressible material and is distorted under tensile loading of the strap hinge at the interior paneling part such that the strap hinge is elongated by a change in length.

3. The part according to claim 2, wherein the strap hinge is tightened and compressed by the compression rib when the airbag is deployed and the airbag door-flap is pressed outwardly.

4. The part according to claim 2, wherein the strap hinge is affixed to the inside of the interior paneling part and the airbag door-flap.

5. The part according to claim 1, wherein the deformation rib is constructed as a buckling rib, and the buckling rib exhibits a break point at the rib base and under tensile loading of the strap hinge being snapped off at the interior paneling part, such that the strap hinge is elongated by a change in length.

6. The part according to claim 1, wherein a plurality of ribs are disposed in the hinge area.

7. The part according to claim 1, wherein the strap hinge follows the contour of the rib.

8. An interior paneling part, comprising:
a hinge area with a rib; and
an airbag door-flap,
wherein the airbag door-flap is rotatably affixed to the interior paneling part in an open state in the hinge area via a flexible strap hinge, and the rib is disposed in the hinge area and is defined by an change in length of the strap hinge and wherein the rib is constructed as a guide rib, the guide rib being firmly connected to an airbag retainer so that the inside of the interior paneling part and the strap hinge runs between the interior paneling part and the airbag retainer, and the guide rib penetrates the strap hinge in the area of a recess and that the longitudinal extent of the recess corresponds to a sum of the change in length and the longitudinal extent of the guide rib.

9. An interior paneling part, comprising:
a hinge area with a rib; and
an airbag door-flap,
wherein the airbag door-flap is rotatably affixed to the interior paneling part in an open state in the hinge area via a flexible strap hinge, and the rib is disposed in the hinge area and is defined by an change in length of the strap hinge and wherein the rib is constructed as a clamping rib on the airbag retainer, and the strap hinge is disposed between the clamping rib and the inside of the interior paneling part and is firmly clamped so that in response to the airbag door-flap opening, tensile forces are greater at the strap hinge than a clamping force and a change in length of the strap hinge occurs.

10. An interior paneling part, comprising:
a hinge area with a rib; and
an airbag door-flap,
wherein the airbag door-flap is rotatably affixed to the interior paneling part in an open state in the hinge area via a flexible strap hinge, and the rib is disposed in the hinge area and is defined by an change in length of the strap hinge and wherein a plurality of ribs include a guide rib and a clamping rib disposed in the hinge area.

11. The part according to claim 10 wherein the guide rib and the clamping rib is disposed alternately in the transverse direction of the strap hinge.

12. The part according to claim 11, wherein the strap hinge is a sheet of fabric.

* * * * *